(12) United States Patent
Chen et al.

(10) Patent No.: US 8,434,234 B2
(45) Date of Patent: May 7, 2013

(54) ELECTRIC SHEARS

(75) Inventors: Wu Chen, Nanjing (CN); Toshinari Yamaoka, Nanjing (CN); Fangjie Nie, Nanjing (CN)

(73) Assignee: Chervon Limited, Hong Kong (HK)

( * ) Notice: Subject to any disclaimer, the term of this patent is extended or adjusted under 35 U.S.C. 154(b) by 359 days.

(21) Appl. No.: 12/880,407

(22) Filed: Sep. 13, 2010

(65) Prior Publication Data
US 2011/0061242 A1 Mar. 17, 2011

(30) Foreign Application Priority Data

Sep. 15, 2009 (CN) .................. 2009 2 0232508 U

(51) Int. Cl.
*B26B 15/00* (2006.01)
(52) U.S. Cl.
USPC .................................. 30/228; 30/247; 30/249
(58) Field of Classification Search .................. 30/228, 30/247, 249
See application file for complete search history.

(56) References Cited

U.S. PATENT DOCUMENTS

| | | | | |
|---|---|---|---|---|
| 3,178,816 A * | 4/1965 | Schmid | | 30/228 |
| 3,279,023 A * | 10/1966 | Zobel | | 26/7 |
| 3,408,875 A * | 11/1968 | Briskman et al. | | 74/48 |
| 3,602,988 A * | 9/1971 | Little | | 30/228 |
| 3,698,086 A * | 10/1972 | Herr | | 30/228 |
| 3,787,742 A * | 1/1974 | Murphy | | 310/50 |
| 5,261,750 A * | 11/1993 | Eckhardt et al. | | 384/455 |
| 5,425,666 A * | 6/1995 | Frank et al. | | 451/344 |
| 5,867,909 A * | 2/1999 | Jeltsch et al. | | 30/228 |
| 6,044,564 A * | 4/2000 | Jeltsch | | 30/228 |
| 7,363,711 B2 * | 4/2008 | Janutin et al. | | 30/228 |
| 8,122,607 B2 * | 2/2012 | Maniwa et al. | | 30/228 |
| 8,276,280 B2 * | 10/2012 | Lee et al. | | 30/228 |
| 2011/0056082 A1 * | 3/2011 | Nie | | 30/228 |
| 2011/0061242 A1 * | 3/2011 | Chen et al. | | 30/228 |
| 2012/0246942 A1 * | 10/2012 | Nie et al. | | 30/247 |

* cited by examiner

*Primary Examiner* — Hwei C Payer
(74) *Attorney, Agent, or Firm* — Greenberg Traurig, LLP

(57) ABSTRACT

Electric shears include a housing, a motor within the housing, a transmission including a reduction gearbox and a bevel gear pair, a fixed blade, a movable blade rotatably connected to the fixed blade and coupled with the motor via the transmission. The movable blade swings back and forth about its connection with the fixed blade. The fixed blade is supported on the reduction gearbox and fixed to the housing together with the reduction gearbox. Electric shears are thus provided with a small shape, a simple and compact interior structure, and better portability.

3 Claims, 2 Drawing Sheets

000
ELECTRIC SHEARS

RELATED APPLICATION INFORMATION

This application claims the benefit of CN 200920232508.9, filed on Sep. 15, 2009, the disclosure of which is incorporated herein by reference in its entirety.

BACKGROUND

In the field of gardening, electric shears are often used to prune trees, particularly, to shape trees or shrubs. Generally, the kind of electric shears used for this purpose have a fixed blade mounted on a support part which is connected to a transmission mechanism or a housing, and a movable blade connected to a motor via the transmission mechanism. During operation, as the fixed blade keeps stable, the rotation movement of the motor is transmitted into the reciprocating swing movement of the movable blade via the transmission mechanism, so that the blade-mouth between the two blades can be opened and closed, and then the branches located at the blade-mouth could be cut off.

Most transmission mechanisms of existing electric shears often take the form of a linkage mechanism and a spur gear transmission mechanism, each of which can transmit the rotation movement of the motor into the reciprocating swing movement of the movable blade, wherein the rods of the linkage mechanism are movably connected with each other and there is rotary motion and sliding motion among the rods. Accordingly, theses linkage mechanisms largely consume the output energy from the motor, which results in the lower shearing efficiency of the electric shears. In another aspect, since the linkage mechanism requires a larger operational space, the electric shears need to be provided with enough interior cavity which results in the electric shears have a larger size. Likewise, the use of the spur gear transmission mechanism will also make the shape of the machine larger. Still further, because the fixed blade is fixed to the housing or the transmission mechanism via the support element, this also results in a machine having a larger external dimension, more parts, and a higher manufacturing cost.

SUMMARY

Described hereinafter is an improved pair of electric shears having a housing, a motor mounted within the housing, a transmission mechanism which includes a reduction gearbox and a bevel gear transmission pair, a stroke-control means that controls movement of a movable blade to swing back and forth about its connection to a fixed blade which, in turn, is supported on the reduction gearbox. The movable blade is coupled to the motor via the transmission mechanism and the fixed blade and the reduction gearbox are fixedly mounted to the housing together. Because the subject electric shears employ a bevel gear transmission pair which does not require a large operational space, it is possible to provide a smaller interior cavity for the machine. As a result, the subject electric shears have a smaller shape, and can be easily operated and carried. In addition, as compared with previously used linkage mechanisms, the bevel gear transmission pair uses energy more efficiently and thereby provides higher operation efficiency for the electric shears.

In another described aspect, the fixed blade of the subject electric shears is directly supported on the reduction gearbox and then secured onto the housing together with the reduction gearbox, which eliminates the need for a support part as seen in previous designs. Thus, in the subject electric shears, less parts are used and the interior structure is simpler and more compact, thus providing electric shears with a smaller shape.

BRIEF DESCRIPTION OF THE DRAWINGS

This subject electric shears will be further explained in detail hereinafter in combination with the accompanying drawings in which.

DETAIL DESCRIPTION

Figure 1:
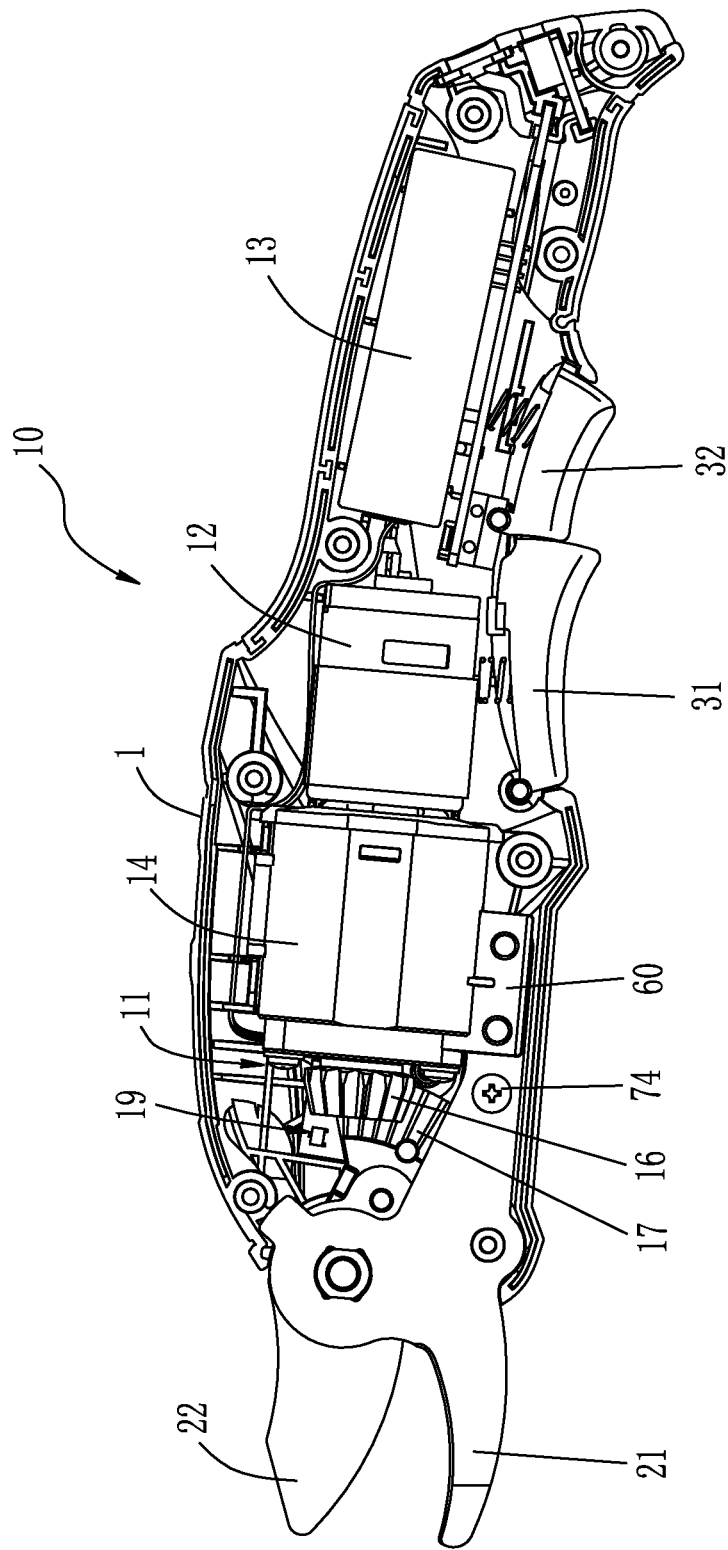
FIG. 1 is a schematic view illustrating the interior structure of an exemplary pair of electric shears constructed according to the description that follows.

As shown in FIG. 1, half of the housing 1 of a pair of electric shears 10 is removed to show the interior structure of the electric shears 10. A transmission means 11, a motor 12, and a battery 13 are mounted within the housing 1 and connected one to another in sequence. A fixed blade 21 and a movable blade 22 that is rotatably connected to the fixed blade 21 are positioned at the front of the housing 1 with the edges of the two blades extending beyond the housing. A trigger 31 and a safety switch 32 are adjacently arranged on the same side of the housing 1, wherein the trigger 31 is used for controlling the motor 12 to work or not to work, and the safety switch 32 can prevent the user from activating the motor accidentally.

The transmission means 11 includes a reduction gearbox 14 and a bevel gear transmission pair. The reduction gearbox 14 is connected to the output shaft of the motor 12 for reducing the rotational speed of the motor output shaft. The bevel gear transmission pair is connected between the movable blade 22 and the reduction gearbox 14, and drives the movable blade 22 to pivot about its central axis which is perpendicular to the axis of the motor. The bevel gear transmission pair comprises a driving bevel gear 16 and a driven bevel gear 17 which are meshed with each other. The driving bevel gear 16 is connected to the output of the reduction gear box 14 and the driven bevel gear 17 is connected to the movable blade 22, wherein the driven bevel gear 17 is a fan-shaped and fractional bevel gear in substance.

The electric shears 10 further comprises a stroke-control means 19 for controlling the movable blade 22 to swing back and forth. In the illustrated embodiment, the stroke-control means may be implemented by a pair of Hall sensors. In other embodiments, the stroke-control means may also take the form of a stroke switch, a photosensitive sensor, etc.

Figure 2:
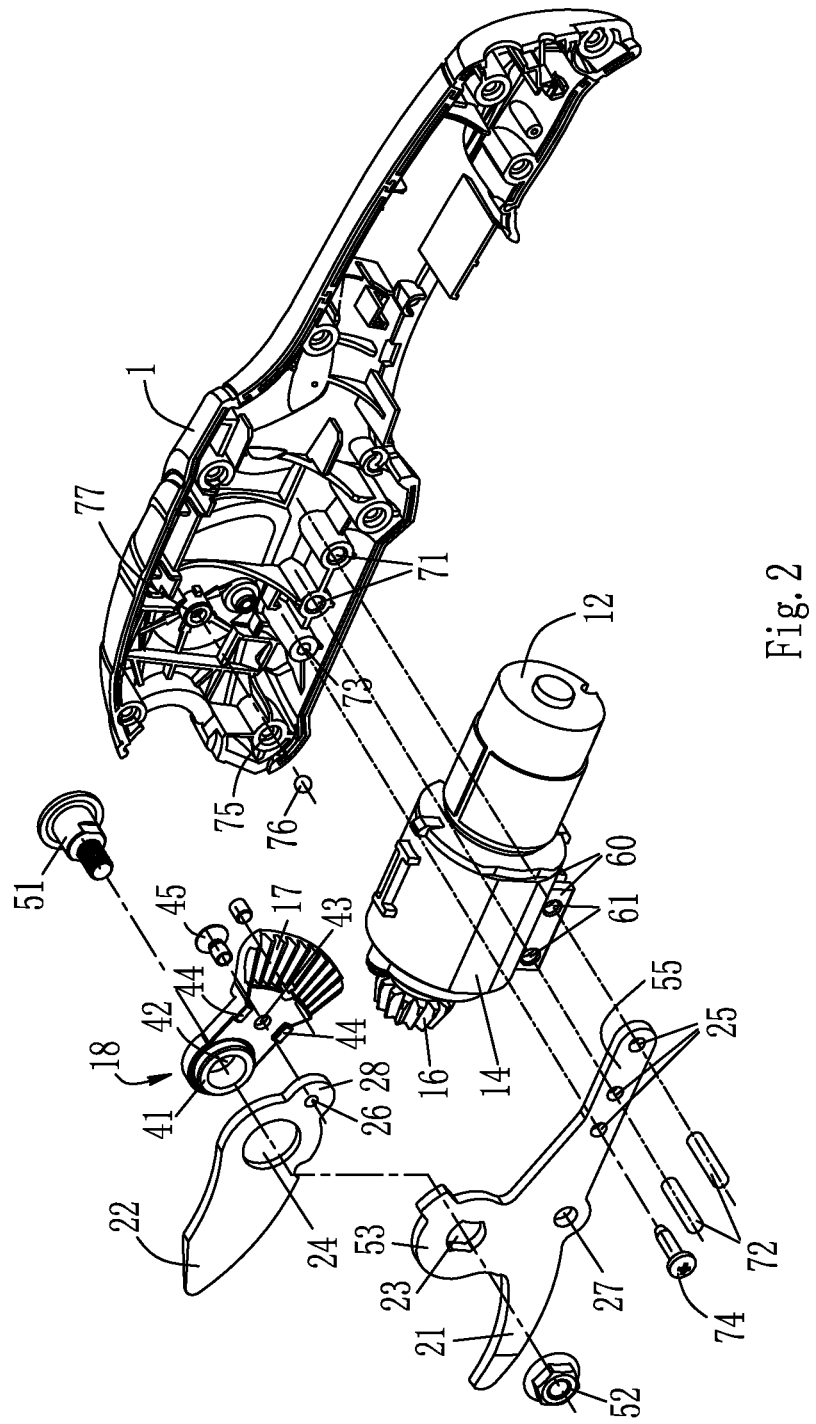
FIG. 2 is an exploded view of the electric shears shown in FIG. 1.

As shown in FIG. 2, the driven bevel gear 17 is formed on a support arm 18 which comprises a flange 41, a big hole 42, a small hole 43, and a pair of stop blocks 44. The movable blade 22 has a big hole 24 and a small screw hole 26 therein. When connecting the support arm 18 with the movable blade 22, the big hole 24 of the movable blade is mounted onto the flange 41 with the mounting end 28 thereof being positioned between the two stop blocks 44, and then a bolt 45 passes through the hole 43 in the support arm and matches with the small screw hole 26 so as to firmly connect the movable blade 22 with the support arm 18.

There are five holes in the fixed blade 21, wherein one big hole 23 is located in a protrusion portion 53 of the fixed blade; three small holes 25 are located in the elongated mounting end 55, and another hole 27 is located substantially in the middle position of the fixed blade. When connecting the movable blade 22, the support arm 18, and the fixed blade 21, the hole 23 of the fixed blade, the hole 24 of the movable blade, and the hole 42 of the support arm are aligned first, and a threaded shaft 51 then passes through the three holes and engages a nut 52, so that the fixed blade 21, the movable blade 22, and the support arm 18 are connected together as a whole with the movable blade 21 and the support arm 18 being rotatable relative to the fixed blade 22.

As shown in FIG. 2, the reduction gearbox 14 has a pair of support plates 60 parallel to each other; each of the support plates 60 respectively providing two holes 61 whose diameter and hole-distance are approximately equal to those of the two holes 25 near the outer end of the fixed blade 21. When the blades 21, 22, the transmission means 11, and the housing 1 are assembled, the mounting end 55 of the fixed blade 21 is inserted between the two support plates 60 and the two holes 25 in the fixed blade near its outer end are aligned with the holes 61 in the two support plates 60 and the two fitting holes 71 in the housing 1, respectively. A pair of pins 72 respectively pass through the holes 25, 61 and then are inserted into the fitting holes 71. Subsequently, a bolt 74 passes through another small hole 25 in the fixed blade and engages the screwed fitting hole 73 in the housing 1, so that the blades 21, 22 and transmission means 11 are secured to the housing 1. To obtain a more reliable assembly, another screw post (not shown) is formed on one half (not shown) of the housing 1, and passes through the middle hole 27 of the fixed blade 21, with its free end being engaged in the fitting hole 75 of the other half of the housing 1.

In the assembled state as shown in FIG. 1, once the motor is activated, the driving bevel gear 16 rotates and drives the driven bevel gear 17 and the movable blade 22 to swing. To eliminate the axial force exerted to the driven bevel gear 17 from the driving bevel gear 16, a spherical element 76 is at least partially located in the fitting hole 77 of the housing 1. In the present embodiment, the spherical element may be embodied as a ball bearing 76. The driven bevel gear 17 always engages at its backside with the ball bearing 76 and then transfers the axial force to the housing 1. Due to the screw connection between the two half-housings, the tension force between the two half-housings and the axial force balance each other. As a result, the potential adverse effect caused by the axial force could be eliminated and the tight engagement between the two bevel gears is ensured.

The electric shears disclosed by the present invention are not limited by the contents described above and the structure shown in the drawings. Rather, those of ordinary skill in the art will appreciate that changes, substitutions, and modifications to the configurations and positions of illustrated and described parts can be made while still falling with the scope of the invention set forth in the claims that follow.

What is claimed is:

1. A pair of electric shears, comprising:
 a housing;
 a motor mounted within the housing;
 a transmission including a reduction gearbox and a bevel gear pair, the bevel gear pair comprising a driving bevel gear and a driven bevel gear which is a fan-shaped and fractional bevel gear, wherein the driven bevel gear engages at its backside with a spherical element which is at least partially located in a fitting hole of the housing;
 a fixed blade; and
 a movable blade connected to the fixed blade and coupled with the motor via the transmission wherein the movable blade is movable about its connection with the fixed blade,
 wherein the fixed blade is supported on the reduction gearbox and fixed to the housing together with the reduction gearbox.

2. The electric shears of claim 1, wherein the driven bevel gear is formed on a support arm which is fixedly connected with the movable blade.

3. The electric shears of claim 2, wherein the reduction gearbox has at least one support plate, the fixed blade and the support plate including a hole, respectively, and the fixed blade is carried on the support plate of the reduction gearbox by engagement between a pin and the holes.

\* \* \* \* \*